United States Patent Office 3,420,810
Patented Jan. 7, 1969

3,420,810
PROCESS FOR JOINING THE A AND B CHAINS
OF INSULIN
Panayotis Katsoyannis, Patchogue, and Andrew M.
Tometsko, Rochester, N.Y., assignors to the United
States of America as represented by the United
States Atomic Energy Commission
No Drawing. Filed Oct. 25, 1966, Ser. No. 589,468
U.S. Cl. 260—112.7                               2 Claims
Int. Cl. C07g 15/00; A61k 17/04; C07b 29/00

ABSTRACT OF THE DISCLOSURE

A method of combining the A chain and B chain of insulin with high yields wherein one equivalent of S-sulfonated B chain is contacted with at least 6 equivalents of the sulfhydryl form of the A chain at low temperature while maintaining the pH of the reaction mass at a pH of from about 9.5 to about 10.8.

State of the prior art

Insulin is a hormone secreted by the pancreas and is required for normal metabolism of carbohydrates; deficiency of the substance leads to the disease diabetes mellitus, characterized by increased blood glucose, excretion of sugar and acetone bodies in urine and depletion of glycogen normally stored in liver and muscle. Insulin extracted from the pancreas of various animals has been found useful in the treatment of patients, suffering from diabetes mellitus. Insulin is a protein molecule having two chains designated by those skilled in the art respectively as the A-chain and the B-chain.

In the Journal of the American Chemical Society 85, 2863, published September 20, 1963, in an article entitled "Insulin Peptides IX—The synthesis of A-chain and its combination with Natural B-chain To Generate Insulin Activity," P. G. Katsoyannis, A. Tometsko and K. Fukuda, there is a disclosure of a method of synthesizing the A-chain of insulin together with a method of combining the synthetic A-chain of insulin with the B-chain of insulin in which the B-chain material was biologically produced.

In a co-pending U.S. patent application, S.N. 437,328, P. G. Katsoyannis, filed Mar. 4, 1965 and now abandoned, there is disclosed a method of synthesizing the B-chain of insulin and a method of combining synthetic A chain with synthetic B chain material to produce insulin.

Currently, the insulin supply on the market from animals is adequate but clinicians are predicting that the supply is liable to be short in the future because of an increase in the number of diabetics arising from improved method of detection of the disease and increased population. Thus, a synthetic source of supply is being sought by those skilled in the art.

Most of the insulin currently utilized in treating patients suffering from diabetes mellitus is obtained from bovine and pork sources. This insulin is not an exact structural duplicate of human insulin and it sometimes produces undesirable allergic resistance in patients taking it, causing a need for increasing dosage rates, e.g. a patient starting to use it may require only 24 activity units per diem, and may progress to a stage where he requires 600 activity units per diem to sustain his life. Those skilled in the art believe there is a strong possibility of lowering this allergic resistance by using synthetic human insulin or analogues of human or animal insulin.

One of the severest drawbacks in producing human insulin has been that while methods of producing synthetic A chain and synthetic B chain are now known to those skilled in the art, the known conventional processes for combining the A chain and B chain to produce insulin are accompanied by low yields. It is an object of this invention to provide a method of combining A chain and B chain insulin materials to produce insulin in high yields.

Description of the invention

We have discovered a method for combining the A chain and B chain of insulin in yields ranging from 60 to 80 percent of possible theoretical yield when the natural chains of insulin are recombined comprising reacting one equivalent of the S-sulfonated form of the B chain of insulin with at least 6 equivalents of the sulfhydryl form of the A chain of insulin, while maintaining the temperature of the reactants at a temperature ranging from about 0° C. to about 2° C., maintaining a slightly alkaline reaction mixture at a pH ranging from between about 9.5 to about 10.8 and, thereafter, recovering the insulin from the reaction mixture. The alkalinity of the reaction solution can be maintained by the addition of known buffers, such as glycine buffer. The glycine buffer can easily be made by adding sufficient sodium hydroxide to a 0.1 molar aqueous solution of glycine to produce the desired pH. The preparation and use of such buffers is well known to those skilled in the art and our invention is not to be limited to any specific buffer. All that is necessary is that the buffer be capable of maintaining the reaction mass within the desired pH range and that it be inert with respect to reactants and reaction products.

There are several procedures available to isolate the insulin produced in our novel process from the reaction products, e.g. that shown and described by L. F. Smith in an article published in Biochimica and Biophysica Acta, 82, 231 (1964). These recovery processes are well known to those skilled in the art.

In the preferred embodiment of our invention, we maintain the alkalinity of the reaction solution at a pH of about 9.5 during the reaction. Our invention is not limited to any particular source of A or B chain of insulin and it permits combining, for example, the A chain of one species, for example, the A chain of human insulin, with the B chain of the same or another species, for example, the B chain of bovine insulin.

The S-sulfonated A and B chains used in the practice of our invention can be prepared by conventional procedures such as those shown in an article published in the American Journal of Medicine, on pages 652 through 661, volume 40, number 5, May 1966.

The following example is given to illustrate the practice of our invention:

Experimental.—The water used in these experiments was deaerated by extensive boiling under nitrogen. All reagents used were of analytcial grade. The natural S-sulfonated forms of A and B chains ($ASSO_3^-$ and $BSSO_3^-$, respectively) were prepared by oxidative sulfitolysis of bovine insulin.

Biological assays.—Insulin determinations were carried out by the mouse convulsion method. Each unknown sample was assayed for 3–4 consecutive days. Each day a new insulin standard was used. Two concentrations of the standard and three concentrations of the unknown sample were injected each day into five groups of 12–16 mice each. For the complete assay of a particular sample, a total of 180–200 mice were used. The reported assay values are the average figures of the 3 or 4 day assays. Highly purified crystalline zinc insulin (bovine) from Eli Lilly and Co., Indianapolis, Indiana, with a specific activity of 25 I.U., was used for the preparation of the reference standards.

Insulin synthesis by recombination of the sulfhydryl form of the B chain with a large excess of the sulfhydryl form of the A chain: A mixture of $BSSO_3^-$ (10 mg.) and $ASSO_3^-$ (42 mg.) was dissolved in water (9 ml.) by adding a few drops of 1 N NaOH. The solution was subsequently adjusted to pH 5.0 with 1 N acetic acid (whereupon a homogeneous precipitate formed), cooled to 0°, and, after adding 1 M mercaptoethanol (1 ml.) and deaerating with an aspirator, was heated in a boiling water bath for 6 minutes. The entire operation was carried out in a nitrogen atmosphere. The reaction mixture was then cooled, adjusted to pH 3.8 with 1 N acetic acid, and allowed to stand at 0° C. for 10 minutes. The precipitated product was isolated by centrifugation (3000 r.p.m.) and washed consecutively with 0.2 M acetate buffer (20 ml.) pH 3.8 and 0.02 M acetate buffer (20 ml.) pH 3.8. A suspension of this precipitate in water (8 ml.) was solubilized by adjusting the pH to 10.6 with 1 N NaOH, mixed with 0.1 M glycine buffer (1 ml.) pH 10.6, and stirred at 0° in contact with air for 24 hours. This solution which had a total volume of 10 ml. was then assayed for insulin activity by the mouse convulsion method and found to possess 20 units of insulin per ml. of solution. Since the theoretical amount of insulin generation, on the basis of the S-sulfonate of the B chain used, is 40 units per ml. of solution (1.6 mg. of insulin per ml.), the overall yield in insulin formation by this method was 50%.

Insulin synthesis by interaction of the sulfhydryl form of the A chain with the S-sulfonate form of the B chain: A solution of $ASSO_3^-$ (20 mg.) in water (5 ml.) was adjusted to pH 5, mixed 1 M mercaptoethanol (0.5–1 ml., 23- to 46-fold excess), deaerated (0° C.) and heated in a boiling water bath for 4–8 minutes. The entire process was carried out in a nitrogen atmosphere. The reaction mixture was then cooled to 10–15° C. and extracted four times with 40-ml. portions of ethyl acetate. After the last extraction, the traces of ethyl acetate were removed by flushing the reaction vessel with nitrogen. The resulting jelly-like product was mixed with $BSSO_3^-$ (5 mg.) and water (7 ml.). After adjusting the pH of the reaction mixture to 10.6 with 1 N NaOH, a clear solution was obtained. This solution was diluted with 0.1 M glycine buffer (0.8 ml.) pH 10.6, stirred for 18 hours at 2° C., and then submitted to insulin assays. In 20 experiments the solution (total vol. 10 ml.) of the recombined unpurified product was shown to possess, by the mouse convulsion method, 12–16 insulin units per ml. Since the theoretical amount of insulin formed, based on the amount of $BSSO_3^-$ used, is 20 units per ml. (0.8 mg. of insulin per ml.), the recombination yield by this method ranges from 60 to 80%.

Insulin synthesis by interaction of the sulfhydryl form of the A chain with a large excess of the S-sulfonate form of the B chain: The recombination step was carried out as in the previous experiment except that only 10 mg. of $ASSO_3^-$ instead of 20 mg. were converted to the sulfhydryl form and then allowed to react with 30 mg. of $BSSO_3^-$. The solution (10 ml.) of the oxidation product in three experiments was found to possess a total of 95–116 insulin units when assayed by the mouse convulsion method. Since the theoretical amount of insulin formed, calculated on the basis of $ASSO_3^-$ used (10 mg.), is 540 units, the recombination yield by this method ranges from 17 to 21% of theory.

Crystallization of insulin.—The insulin formed by the recombination of natural bovine insulin chains was isolated and crystallized by the procedure described by Smith in Biochimica and Biophysica Acta, 82, 231 (1964). The crystalline material had an activity of 24 units per mg.

We claim:

1. A method of combining the A chain and B chain of insulin, comprising reacting an aqueous solution containing one equivalent of the S-sulfonated form of the B chain of insulin with an aqueous solution containing at least 6 equivalents of the sulfhydryl form of the A chain of insulin for about 18 hours, while maintaining the temperature of the reactants at a temperature ranging from between about 0° C. to about 2° C. and maintaining the pH of the reaction mixture at a pH ranging from between about 9.5 to about 10.8.

2. The method of claim 1 wherein the pH of the reaction mixture is maintained at 10.6.

References Cited

Katsoyannis: Proc. Natl. Acad. Sci. 55, 1554–1561 (1966).

Dixon et al.: Nature 188, 721–724 (1960).

Du et al.: cited in Chem. Abst. 62, 13410–13411 (1965).

LEWIS GOTTS, *Primary Examiner.*

MELVYN M. KASSENOFF, *Assistant Examiner.*

U.S. Cl. X.R.

424—178